(12) United States Patent
Lindqvist

(10) Patent No.: US 8,669,766 B2
(45) Date of Patent: Mar. 11, 2014

(54) CARBON AEROGEL BASED ELECTRODE FOR ELECTRIC FIELD MEASUREMENTS IN WATER

(75) Inventor: Ulf Peter Lindqvist, Segeltorp (SE)

(73) Assignee: PGS Geophysical AS, Lysaker (NO)

( * ) Notice: Subject to any disclaimer, the term of this patent is extended or adjusted under 35 U.S.C. 154(b) by 417 days.

(21) Appl. No.: 13/052,824

(22) Filed: Mar. 21, 2011

(65) Prior Publication Data
US 2012/0242343 A1    Sep. 27, 2012

(51) Int. Cl.
*G01V 3/00* (2006.01)
*G01V 3/02* (2006.01)

(52) U.S. Cl.
USPC .......................... 324/347; 324/357; 324/365

(58) Field of Classification Search
None
See application file for complete search history.

(56) References Cited

U.S. PATENT DOCUMENTS

| | | | |
|---|---|---|---|
| 4,617,518 A | 10/1986 | Srnka | |
| 6,104,357 A | 8/2000 | Brage | |
| 6,592,730 B1 * | 7/2003 | Kelsch et al. | 204/412 |
| 6,761,809 B2 * | 7/2004 | Tran et al. | 204/286.1 |
| 7,446,535 B1 * | 11/2008 | Tenghamn et al. | 324/365 |
| 2010/0001733 A1 * | 1/2010 | Combee | 324/332 |
| 2010/0013485 A1 * | 1/2010 | Alumbaugh et al. | 324/337 |
| 2010/0188090 A1 * | 7/2010 | Ziolkowski | 324/335 |

* cited by examiner

*Primary Examiner* — Melissa Koval
*Assistant Examiner* — Courtney McDonnough

(57) ABSTRACT

The present disclosure relates to methods and systems for detecting electric potential difference in water. A first electrode comprising a first electrode body is configured to be in electrical contact with the water when the device is disposed in the water. A second electrode comprising a second electrode body is configured to be in electrical contact with the water when the device is disposed in the water. An electrical connection exists amongst the first electrode, the second electrode, and a voltage measuring device. At least one of the first electrode body and the second electrode body is formed at least partially of a carbon aerogel material.

30 Claims, 3 Drawing Sheets

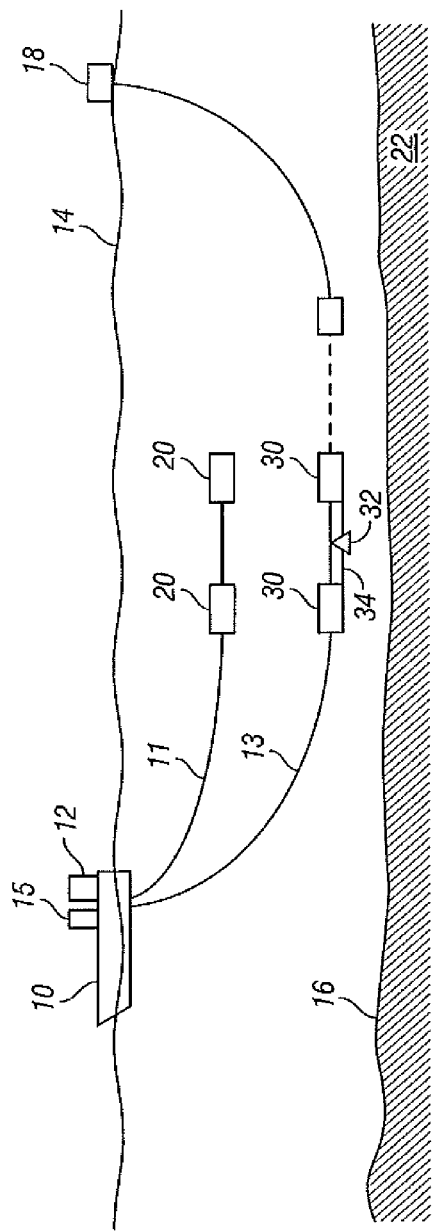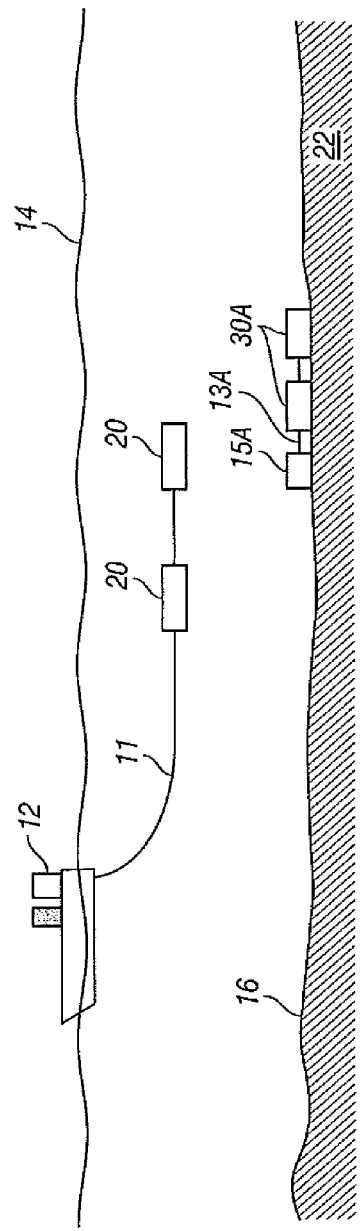

CARBON AEROGEL BASED ELECTRODE FOR ELECTRIC FIELD MEASUREMENTS IN WATER

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE DISCLOSURE

The present disclosure is related to systems and methods for estimating the response of rock formations in the Earth's subsurface to imparted electromagnetic fields in order to determine spatial distribution of electrical properties of the formations, and, at least in some embodiments, to electrode structures utilized in such systems and methods.

BACKGROUND OF THE DISCLOSURE

Porous subsurface sedimentary rock formations are typically saturated with fluids. The fluids may be entirely water, however, in some subsurface formations, the water in the pore spaces may have been displaced by hydrocarbons such as oil and gas. Thus, some present day subsurface formations may have pore spaces containing water, gas or oil, or mixtures thereof.

Detection of formations with oil or gas present in the pore spaces is of significant economic interest. Certain techniques for detection of such formations include determining the existence of subsurface electrical resistivities that are anomalously high. The principle of such detection is based on the fact that the flow of electric current through a porous rock formation is related to the fractional volume of the pore spaces with respect to the total rock volume, the spatial configuration of the pore spaces, and the electrical properties of the fluids filling the pore spaces. For example, brine-saturated porous rock formations are typically much less resistive than the same rock formations having hydrocarbons in some or all of the pore spaces because brine is a relatively good electrical conductor while hydrocarbons are typically good electrical insulators.

Various techniques for measuring the electrical resistivity of subsurface rock formations are known in the art and may include imparting an electromagnetic field into the subsurface formations and measuring electromagnetic fields induced in the subsurface formation in response to the imparted electromagnetic field. For such measurement techniques, the electromagnetic field may be imparted using an electromagnetic field transmitter, for example, by passing an electric current through a dipole electrode pair.

The electric current used to impart the electromagnetic field may be controlled to provide a transient electromagnetic field, and the responses measured by electromagnetic receivers may be related to transient response of the formations in the earth's subsurface. Transient electromagnetic fields may be imparted by switching the transmitter current on, switching the transmitter current off, reversing the polarity of the transmitter current, or combinations thereof. The electromagnetic field induced by the transmitter typically has a very small voltage and may have poor signal quality due to electrical noise. It is desirable to mitigate or reduce electrical noise during low voltage measurement.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 1A shows a schematic of an electromagnetic survey system according to one embodiment of the present disclosure;

FIG. 1B shows a schematic of an electromagnetic survey system according to another embodiment of the present disclosure;

DETAILED DESCRIPTION

Figure 2A:
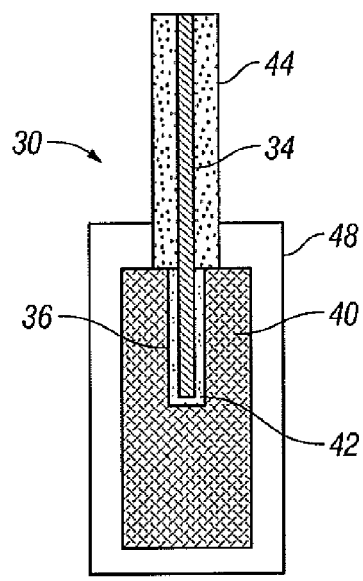
FIG. 2A shows a schematic of an electrode for one embodiment of an electromagnetic survey system according to the present disclosure.

In aspects, the present disclosure relates to systems and methods for estimating the response of rock formations in the Earth's subsurface to imparted electromagnetic fields in order to determine spatial distribution of electrical properties of the formations, and, at least in some embodiments, to electrode structures utilized in such systems and methods.

Typical deployments of marine geophysical survey systems are shown schematically in FIGS. 1A and 1B. In FIG. 1A, a survey vessel 10 may be deployed on the surface of a body of water 14 such as a lake or the ocean. The survey vessel 10 may deploy source electrodes 20 on a transmitter cable 11 into the water 14. The source electrodes 20 may be disposed at a selected distance from each other and may be coupled by transmitter cable 11 to a control and power supply system 12 disposed on the survey vessel 10. Additional source electrodes (not shown) may be deployed along transmitter cable 11, on another transmitter cable (not shown) coupled to survey vessel 10, or on another transmitter cable (not shown) coupled to another survey vessel (not shown). The additional source electrodes may be energized by control and power supply system 12 (or likewise by a control and power supply system on another survey vessel) with a current that may be similar to or different from the current between source electrodes 20. The survey vessel 10 may also deploy a receiver cable 13 in the water 14. Recording system 15 may be disposed on the survey vessel 10 and may receive data from receiver cable 13. Alternatively, the receiver cable 13 may be similarly deployed by a second vessel (not shown), on which may be disposed a second recording system. In some embodiments, receiver cable 13 may transmit data to recording buoy IS located at a distal end of receiver cable 13. In other embodiments, as illustrated in FIG. 1B, the receiver cable 13A and recording system 15A may be deployed at the water bottom 16. At least one pair of electrodes 30 may be disposed at spaced apart positions along the receiver cable 13, as illustrated in FIG. 1A. The pair of electrodes 30 on receiver cable 13 may be electric dipoles. A voltage measuring device 32 may be operatively coupled to the electrodes 30 to measure, for example, the electric potential difference between the electrodes 30. The receiver cable 13 may be deployed such that the at least one pair of electrodes 30 may be positioned at a desired distance from the water bottom 16 and/or source electrodes 20. The receiver cable 13 may include additional components, such as one or more power conductors, data conductors, or strength members for bearing tension loads associated with towing. Additionally, the receiver cable 13 may be insulated or otherwise protected for use in a water environment. It may also include a multifold of additional sensors; such as hydrophones, velocity meters, acceleration meters, force meters, tilt meters or compasses. As shown schematically in FIG. 1B, in some embodiments, receiver cable 13A and electrodes 30A may be deployed at the water bottom 16. In this embodiment, the recording system 15A may be located near or on the water bottom 16, and the receiver cable 13A may not be physically attached to survey vessel 10. Some embodiments may also be in a more compact form, as in a bottom node system, wherein electrodes 30A are disposed on one or more receiver tube arms coupled to and extendable out from the center recording system 15A. As would be understood by one of ordinary skill in the art with the benefit of this disclosure, in such embodiments, the receiver tube arms provide the functional equivalent of receiver cable 13A. In fact, in other embodiments, receiver cable 13A may be substituted by any receiver mounting which provides support and separation of the electrodes.

Referring now to FIG. 1A, each of the electrodes 30 may be in electrical communication with an electrical conductor 34, which may be at least partially surrounded by an electrical insulator. The voltage measuring device 32 may be electrically connected to the electrical conductors 34 to measure at least one electric field property between the pair of electrodes 30 (e.g., electric potential difference between the electrodes 30). The conductor 34 may be made of any electrically conductive material, and will likely be made of a metal (e.g., silver). The electrical conductor 34 and/or surrounding electrical insulator may be integrated into or separate from receiver cable 13.

Referring now to FIG. 2A, there is shown an example electrode 30. The electrode 30 may be formed at least partially of a material that is both conductive and inert in a marine environment. The electrode 30 may comprise a body 40, which, in some embodiments, is electrically coupled to electrical conductor 34 by a conductive bonding agent 42. The conductive bonding agent 42 may at least partially coat interior surface 36 of body 40. In some embodiments, the conductive bonding agent 42 may be a conductive epoxy (e.g., an epoxy filled with silver or carbon powder). Electrical conductor 34 may be at least partially surrounded by an insulator 44. In some embodiments, the body 40 may be protected from the marine environment by a protective shield 48. The protective shield 48 may allow for electrical contact between body 40 and water 14, while still protecting the body 40 from contact with flowing water, which may cause interference with signal reception, physical erosion, or impact damage. In certain embodiments, the protective shield 48 may be formed at least partially of a conductive material. The body 40 may be formed at least partially of a carbon aerogel material. As used herein, the term carbon aerogel refers to a carbon-based material that, when solid, comprises a highly porous matrix. As would be understood by one of ordinary skill in the art with the benefit of this disclosure, carbon aerogel materials are generally manufactured by extracting a liquid component of a gel through a supercritical drying process, thereby allowing the liquid to be slowly drawn off without causing the solid matrix in the gel to collapse from capillary action. Typically, a carbon aerogel material has a generally monolithic, (i.e., continuous, non-fibrous) structure and exhibits high surface area per mass and electrical conductivity. Generally, the material volume of a carbon aerogel material is mainly void, with a carbon glass like inter-connected structure. In some embodiments, a suitable carbon aerogel material may exhibit a surface area per mass of at least about 100 square meters per gram, a surface area to volume ratio of over about 100 square meters per cubic centimeter, and/or an electrical conductivity of at least about 25 Siemens per centimeter. In some embodiments, the surface area to volume ratio may be up to about 400 square meters per cubic centimeter. These values may be greater than conventional metal electrode materials, such as copper and silver. It is currently believed that, as the effective surface area of the electrodes is increased, the observed self noise decreases. Accordingly, similar or better noise reduction characteristics may be achieved with use of carbon aerogel based electrodes in comparison to conventional electrode materials of the same mass. Likewise, a suitable carbon aerogel based electrode may be much lighter than a metal electrode of the same volume, while providing similar or better noise performance. Also, because carbon aerogel material is largely inert, even in a marine environment, the carbon aerogel portion of the electrodes 30 may suffer little or no degradation due to chemical reactions with the marine environment. Moreover, carbon aerogel material may provide one or more features not readily present in conventional, non-metal electrode materials, such as carbon fiber. For instance, electrodes made from carbon fiber materials often require a relatively complex manufacturing step of electrically coupling numerous individual carbon fibers to adjacent surfaces. However, as mentioned previously, a carbon aerogel material is generally non-fibrous. Therefore, when the body 40 is formed at least partially of carbon aerogel material, a conductive path may be formed between the conductor 34 and the surrounding water 14, without requiring coupling of numerous individual carbon fibers.

Some embodiments of the present disclosure may vary the porosity (i.e. the size and number of pores or cells) or other property of a carbon aerogel material to decrease the propensity of the body 40 to fracturing when subjected to the forces and pressures applied during storage, handling, and/or deployment of the electrodes 30. Furthermore, some embodiments of the present disclosure may use carbon aerogel materials specifically formulated for use in a marine environment. For example, the exterior and/or the interior of the body 40 may be formulated to be hydrophobic to further resist water invasion into the electrode 30. Additionally, in some embodiments, carbon aerogel composites may be used. Such materials may include a metal or metal oxide within the carbon aerogel structure. Appropriate composites may be selected to vary one or more properties of the electrodes 30 to better accommodate the marine environment, improve operation, reduce costs, and/or to increase service life.

Referring still to FIG. 2A, while the entire body 40 is depicted as being formed of a uniform material, it should be understood that, in certain embodiments, carbon aerogel material may be used only in the location(s) necessary, and only in the amount necessary, to provide a suitable conductive path (i.e lower the electrical resistance) between the surrounding water 14 and the conductor 34.

As stated above, in some embodiments, the body 40 may be protected from the marine environment by a protective shield 48. The protective shield 48 may protect the body 40 from contact with flowing water, which may cause interference with signal reception, physical erosion, or impact damage. In certain embodiments, the protective shield 48 may be formed at least partially of a porous nonconductive material, such as construction felt, porous plastics, or ceramics. In some embodiments, the protective shield 48 may be formed at least partially of a conductive material, such as a conductive gel or other membrane. Suitable conductive or non-conductive materials may include, but are not limited to, one or any combination of: solids, liquids, gels, membranes, fibers, felt, etc. In addition to reducing water flow near the body 40 and physical wear thereof, the protective shield 48 may provide additional functions. For example, certain forms of carbon aerogel materials may be brittle. The protective shield 48, therefore, may provide a resilient shielding that absorbs shocks or vibration that may fracture the body 40; e.g., the protective shield 48 may include a material that is less rigid that the body 40. In some embodiments, the material(s) of protective shield 48 may be refreshed or re-applied prior to each use of electrode 30. In some embodiments, the protective shield 48 may be permanently secured to the body 40.

It should be understood that the FIG. 2A embodiment merely illustrates one non-limiting arrangement for the electrode 30. The electrode 30 may include seals, protective sleeves, and other devices to enhance the operation and robustness of the electrode 30. Other embodiments may employ a different contact arrangement, e.g., an exterior surface of the body 40 may be connected to the conductor 34. Also, the insulator 44 may surround a portion of the body 40.

Figure 2B:
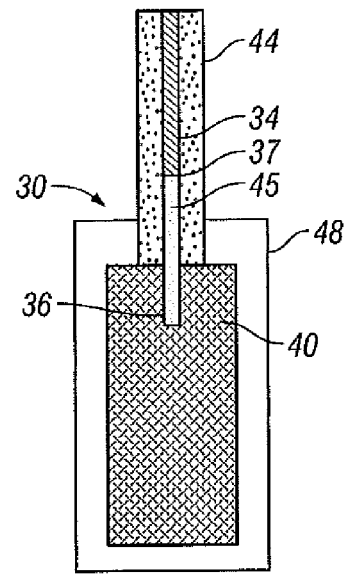
FIG. 2B shows a schematic of another electrode for one embodiment of an electromagnetic survey system according to the present disclosure.

Referring now to FIG. 2B, there is shown an embodiment of an electrode 30 that does not use the conductive bonding agent 42 of FIG. 2A, which may be a potential leak path into the electrode 30. In FIG. 2B, the electrode 30 uses a porous-free electrically conductive (e.g., carbon glass) connector 45 to electrically couple the body 40 to the electrical conductor 34. In some embodiments, because carbon glass is formed of carbon, a covalent bond may be formed between the carbon aerogel material of body 40 and the carbon glass of conductive connector 45. Thus, in some embodiments, the carbon aerogel material of the body 40 may be "grown" directly onto the carbon glass conductive connector 45. By "grown," it is meant that the body 40 is integrated with the conductive connector 45 during the manufacturing process, which eliminates a discrete intermediate component (e.g., conductive bonding agent 42). Thus, the direct bond of body 40 to conductive connector 45 may eliminate an interface for water to penetrate between the conductive connector 45 and the body 40. The use of carbon glass is illustrative and exemplary only, as any material that exhibits similar material properties may be used. The FIG. 2B embodiment does include an interface 37 between the conductor 34 and the conductive connector 45. It should be appreciated, however, that because conductive connector 45 is made from a generally pore-free material, there is less risk that water can penetrate through the conductive connector 45 to the interface to degrade the electrical conductor 34.

Figure 2C:
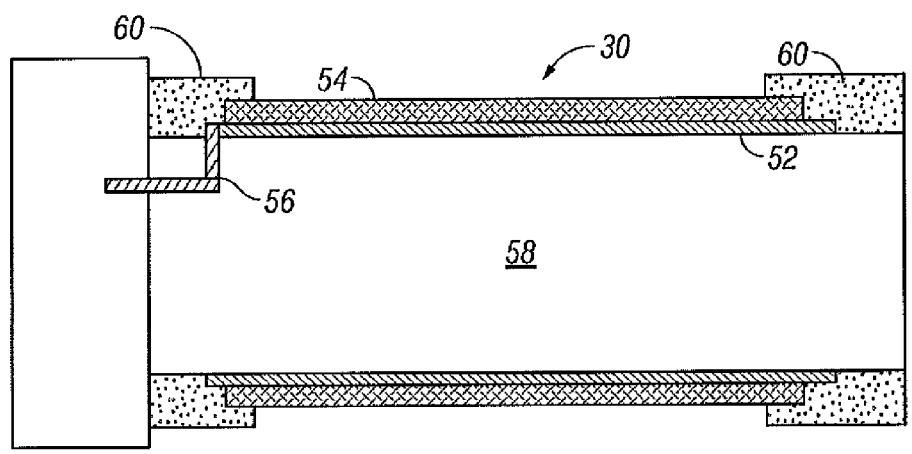
FIG. 2C shows a schematic of another electrode for one embodiment of an electromagnetic survey system according to the present disclosure.

Referring now to FIG. 2C, there is shown an embodiment of an electrode 30 that may be deployed on a receiver cable 13 (FIG. 1). In one embodiment, the electrode 30 comprises a conductive connector 52, a body 54, made at least partial of a carbon aerogel material, disposed in contact with the conductive connector 52, and a conductor 56 electrically connected to the conductive connector 52. The conductive connector 52 may be formed as a mandrel or sleeve-like structure. In one embodiment, the conductive connector 52 may be formed partially or wholly of a metal such as silver, gold, platinum, etc. In such embodiments, a suitable conductive bonding agent (not shown) may be used to adhere and electrically couple the body 54 to the conductive connector 52. In other embodiments, the body 54 may be affixed to the conductive connector 52 using a mechanical device such as a clamp (not shown). In still other embodiments, the conductive connector 52 may be formed partially or wholly of a porous-free electrically conductive (e.g., carbon glass) material. As noted previously, the body 54 may be grown directly on the carbon glass of conductive connector 52. Interior 58, interior to conductive connector 52, may accommodate conductor 56, as well as other equipment, e.g., power conductors, data conductors, tension support members, cables, and other equipment. The ends of the electrode 30 may be enclosed by an appropriately formed jacket 60 that may be a part of the receiver cable 13 (FIG. 1) or a separate element. The body 54 of electrode 30 may be protected from contact with the surrounding water 14 by a protective cover or shield (not shown).

Figure 3:
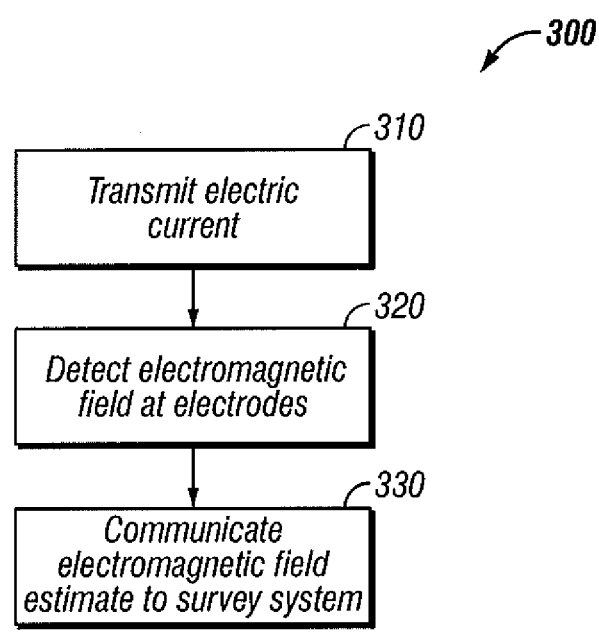
FIG. 3 shows a flow chart of one embodiment of the method according to the present disclosure.

FIG. 3 provides a flow chart for a method 300 that employs a marine geophysical survey system according to one embodiment of the present disclosure. For convenience, reference will be made to FIG. 1A and FIG. 3 to describe an exemplary mode of operation using such a system. In preparation for the survey, the survey vessel 10 may deploy the transmitter cable 11 and the receiver cable 13 into the water 14. At step 310, control and power supply system 12 causes an electric current to flow between source electrodes 20. If multiple currents are induced, then the currents may have the same or different amplitudes and frequencies. Such electric current produces an electromagnetic field that may propagate through the water 14 and into formations beneath the water bottom 16. At step 320, a responsive electromagnetic field resulting from the electromagnetic field imparted in the formations below the water bottom 22 may be detected across the at least one pair of electrodes 30. For example, the electric potential difference between the at least one pair of electrodes 30 may be measured by the voltage measuring device 32. At step 340, data relating to the measured electromagnetic field may be communicated to the surface through receiver cable 13. This data may be received and stored at a recording system 15 disposed on the survey vessel 10, may be communicated for storage in a recording buoy 18 at a distal end of the receiver cable 13, or otherwise transmitted to a desired recipient.

As would be appreciated by one of ordinary skill in the art with the benefit of this disclosure, carbon aerogel based electrodes 30 as described herein may be useful for a number of applications. While the above discussion highlights benefits to marine geophysical surveys, carbon aerogel based electrodes may be suitable for any application which seeks to make electric field measurements in water.

As noted earlier, the carbon aerogel based electrodes 30 may not chemically interact with the water in a manner that meaningfully degrades any operational feature. Therefore, the electrodes 30 may have a longer lifetime in water, may require less refurbishment between survey campaigns, and may be used for more surveys prior to refurbishment or replacement.

The systems shown in FIGS. 1A and 1B include transmitter and receiver electrodes configured as horizontal electric dipoles. It will be appreciated by those skilled in the art that any other known form of electromagnetic transmitter and receiver, for example, vertical electric dipoles (pairs of electrodes oriented vertically), horizontal magnetic dipoles (wire coils oriented so that the longitudinal axis of the coils is horizontal) and vertical magnetic dipoles (the vertical magnetic analog of the vertical electric dipole) may be used in other examples. The foregoing examples of acquisition systems used in a marine environment are provided only to illustrate acquisition of electromagnetic survey data. Methods according to the present disclosure can be used in electromagnetic surveys conducted on land, and the present disclosure is not limited to use with marine surveys.

While the foregoing disclosure is directed to the one mode embodiments of the disclosure, various modifications will be apparent to those skilled in the art. It is intended that all variations be embraced by the foregoing disclosure.

I claim:

1. A device for detecting electric potential difference in water comprising:
    a first electrode comprising a first electrode body configured to be in electrical contact with the water when the device is disposed in the water;
    a second electrode comprising a second electrode body configured to be in electrical contact with the water when the device is disposed in the water; and
    an electrical connection amongst the first electrode, the second electrode, and a voltage measuring device, wherein at least one of the first electrode body and the second electrode body is formed at least partially of a carbon aerogel material having a surface area to volume ratio up to about 400 square meters per cubic centimeter.

2. The device of claim 1 wherein:
    the first electrode further comprises a first conductor and an electrical coupling between the first conductor and the first electrode body;
    the second electrode further comprises a second conductor and an electrical coupling between the second conductor and the second electrode body; and
    the electrical connection comprises the first conductor and the second conductor.

3. The device of claim 2 wherein at least one of the electrical couplings comprises a conductive bonding agent.

4. The device of claim 2 wherein at least one of the electrical couplings comprises a porous-free electrically conductive connector.

5. The device of claim 4 wherein the porous-free electrically conductive connector comprises a carbon glass material.

6. The device of claim 1, wherein the carbon aerogel material has an electrical conductivity of at least 25 Siemens per centimeter.

7. A system for conducting a marine geophysical survey, comprising:
    a receiver mounting configured to be deployed into a body of water;
    a first and a second electrode positioned along the receiver mounting, wherein at least one electrode comprises an electrode body formed at least partially of a carbon aerogel material; and
    a voltage measuring device operatively coupled to the first and the second electrode, configured to measure electric potential difference between the first and the second electrode, wherein the at least one electrode further comprises a protective shield at least partially surrounding the electrode body.

8. The system of claim 7, further comprising a controllable source configured to induce an electromagnetic field in an earth formation below the body of water, wherein the first and second electrodes are positioned to detect a responsive electromagnetic field from the earth formation.

9. The system of claim 7, wherein the at least one electrode further comprises:
    a conductor making an electrical connection to the voltage measuring device; and
    an electrical coupling between the conductor and the electrode body.

10. The system of claim 9 wherein the electrical coupling comprises a conductive bonding agent.

11. The system of claim 9 wherein the electrical coupling comprises a porous-free electrically conductive connector.

12. The system of claim 11 wherein the porous-free electrically conductive connector comprises a carbon glass material.

13. The system of claim 7 wherein the receiver mounting comprises a receiver cable.

14. The system of claim 13 further comprising a marine vessel configured to deploy the receiver cable.

15. The system of claim 7, wherein the electrodes are configured to be positioned at the bottom of a body of water.

16. An apparatus for estimating electromagnetic field strength in a body of water, comprising:
    a first electrode comprising an associated electrode body, the electrode body formed at least partially of a carbon aerogel material, and having an associated conductor;
    a second electrode spaced apart from the first electrode, the second electrode comprising an associated electrode body, the electrode body formed at least partially of a carbon aerogel material, and having an associated conductor;
    a protective shield at least partially surrounding at least one of the electrode bodies; and
    a voltage measuring device making an electrical connection to each of the first electrode and the second electrode via the associated conductors, the voltage measuring device being configured to measure electric potential difference between the first and the second electrode.

17. The apparatus of claim 16, further comprising a controllable source configured to induce an electromagnetic field in an earth formation below a bottom of the body of water, wherein the first and second electrodes are positioned to detect a responsive electric field from the earth formation.

18. The apparatus of claim 16, wherein at least one electrode further comprises a conductive bonding agent electrically coupling the associated electrode body to the associated conductor.

19. The apparatus of claim 16, wherein at least one electrode further comprises a porous-free electrically conductive connector electrically coupling the associated electrode body to the associated conductor.

20. The apparatus of claim 19, wherein the porous-free electrically conductive connector comprises a carbon glass material.

21. The apparatus of claim 16, wherein the protective shield comprises at least one material selected from the group consisting of: a porous nonconductive material, a construction felt, a porous plastic, a ceramic, a conductive gel, a conductive membrane, a solid, a liquid, a gel, a membrane, a fiber, a felt, and any combination thereof.

22. The apparatus of claim 16, wherein the electrodes are configured to be positioned at the bottom of a body of water.

23. The device of claim 16, wherein the carbon aerogel material has a surface area to volume ratio up to about 400 square meters per cubic centimeter.

24. A method of performing a geophysical survey, comprising:
    providing a receiver disposed in a body of water, the receiver comprising:
    a pair of electrodes, wherein at least one electrode comprises an electrode body formed at least partially of a carbon aerogel material, and
    a voltage measuring device electrically connected to each electrode via an associated electrical conductor; and measuring an electric potential difference between the electrodes with the voltage measuring device.

25. The method of claim 24, further comprising: positioning the receiver at a bottom of the body of water.

26. The method of claim 24, further comprising: positioning the receiver a specified distance above a bottom of the body of water.

27. The method of claim 24, wherein the electrode body is electrically coupled to the associated electrical conductor using a conductive bonding agent.

28. The method of claim 24, wherein the electrode body is electrically coupled to the associated electrical conductor using a porous-free electrically conductive connector.

29. The method of claim 28 wherein the porous-free electrically conductive connector comprises a carbon glass material.

30. The method of claim 24, wherein the electrode body is at least partially surrounded by a protective shield.

\* \* \* \* \*